J. LAKE, Jr.
BRACKET BOX FOR INDICATING INSTRUMENTS.
APPLICATION FILED MAY 14, 1919.
1,330,196.	Patented Feb. 10, 1920.
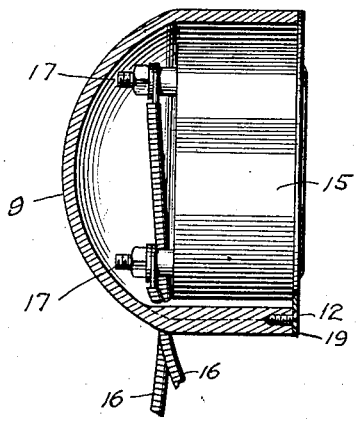
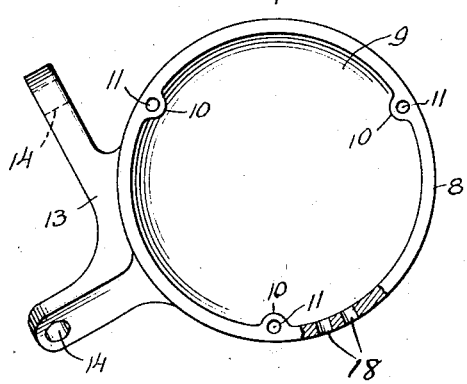 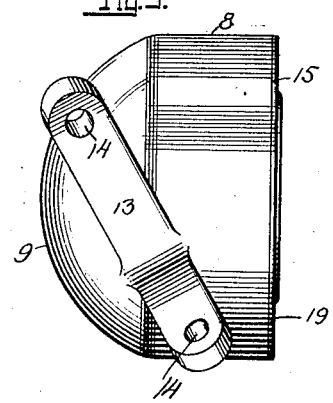
Witnesses:	Inventor
M. E. Lessin	JAMES LAKE Jr.
By his Attorney

UNITED STATES PATENT OFFICE.

JAMES LAKE, JR., OF BROOKLYN, NEW YORK.

BRACKET-BOX FOR INDICATING INSTRUMENTS.

1,330,196.      Specification of Letters Patent.      Patented Feb. 10, 1920.

Application filed May 14, 1919. Serial No. 297,006.

*To all whom it may concern:*

Be it known that I, JAMES LAKE, Jr., a citizen of the United States, and resident of New York city, borough of Brooklyn, in the county of Kings and State of New York, have invented certain new and useful Improvements in Bracket-Boxes for Indicating Instruments, of which the following is a full, clear, and exact description.

Among the principal objects which the present invention has in view are: to provide a durable support for indicating instruments when mounting the same on mobile vehicles; to furnish a weather-proof receptacle and bracket; to lessen the cost of construction of a bracket of the character mentioned; and to protect the instrument against damage by a blow.

Drawings.

Figure 1 is a section of a bracket box constructed and arranged in accordance with the present invention, the section being taken as on the line 1—1 in Fig. 2.

Fig. 2 is a front view of the bracket box herein described, a portion of the perimeter being cut away to show inlet passages formed in the wall of said box.

Fig. 3 is a side view of the bracket box.

Description.

As seen in the drawings, the box 8 is circular in form and is provided with a globular extension 9. At intervals the cylindrical wall of the box 8 has inwardly extending bosses 10 provided for receiving taper bores 11 for receiving the fastening screws 12.

Integrally formed with the box 12 and extension 9 thereof, is an angular bracket 13. The bracket 13 has two extensions at the extremity of each of which is a perforation 14, for receiving bolts for fastening the bracket box to the vehicle structure.

In the drawings, the invention is shown in its particular employment as a support for an electric ammeter as indicated by the numeral 15. The ammeter 15 has an extended flange 19 through which the fasteners 12 are passed. The flange 19 fits the perimeter of the case 8 so closely as to render the joint formed therebetween weatherproof.

To permit the introduction of the circuit wires 16 the box 8 is furnished with two holes 18. The wires 16 after being passed through the holes 18 are bound by means of nuts to the binding posts 17.

By means of the arrangement of the extensions of the bracket 13, it is evident the box may be attached permanently and rigidly to any structure for which it is designed.

It is equally evident that when the box is in service position, the same is held firmly against harm or destruction in the event that the machine or vehicle to which it is attached should be overturned. Also it is evident that when the ammeter 15, or other indicating instrument is held within the box 8, it is fully protected from the weather.

Claims:

1. A bracket box having sides, bottom and hanger extensions, all integrally constructed, said extensions being disposed in perpendicular relation to each other and in the same plane, said plane being inclined to the plane of the opening edge of said box.

2. A bracket box comprising a body having a thin continuous wall provided at intervals with supporting bosses extending toward the center of said body for supporting the instrument mounted in said body, said bosses being adapted for holding fastening members for securing said instrument, and a bifurcated hanger bracket having extensions angularly disposed in a plane inclined to the plane of said box.

3. A bracket box comprising a body having a thin continuous wall provided with perforations for receiving electric wire terminals and provided at intervals with bosses extending toward the center of said body for supporting the instrument mounted in said body, said bosses being adapted for holding fastening members for securing said instrument, and a bifurcated hanger bracket having extensions angularly disposed in a plane inclined to the plane of said box.

4. A bracket box for electrical indicating instruments provided with exposed binding posts projecting from the back thereof, said box having a continuous walled extended body portion open at one end only for forming a weather tight joint with the supporting flange of said electrical instruments and for maintaining said binding posts in spaced relation to the wall of said box, said wall being rearwardly extended to provide an appreciable space between said wall and said binding posts, and having passages formed therein for electric wires supplying said instruments.

JAMES LAKE, JR.